US011809230B2

(12) United States Patent
Ciolek et al.

(10) Patent No.: US 11,809,230 B2
(45) Date of Patent: Nov. 7, 2023

(54) DOCKING STATION FOR ACCOMMODATING A TABLET COMPUTER DEVICE

(71) Applicant: Siemens Healthcare GmbH, Erlangen (DE)

(72) Inventors: Marquart Ciolek, Nuremberg (DE); David Dederichs, Poxdorf (DE); Roman Achleitner, Nuremberg (DE); Guo Chen Zhong, Shanghai (CN)

(73) Assignee: SIEMENS HEALTHCARE GMBH, Erlangen (DE)

( * ) Notice: Subject to any disclaimer, the term of this patent is extended or adjusted under 35 U.S.C. 154(b) by 72 days.

(21) Appl. No.: 17/337,577

(22) Filed: Jun. 3, 2021

(65) Prior Publication Data

US 2021/0389803 A1 Dec. 16, 2021

(30) Foreign Application Priority Data

Jun. 12, 2020 (DE) ...................... 20 2020 103 384.0

(51) Int. Cl.
*G06F 1/16* (2006.01)
(52) U.S. Cl.
CPC .......... *G06F 1/1632* (2013.01); *G06F 1/1626* (2013.01)
(58) Field of Classification Search
CPC .................................................. G06F 1/1632
See application file for complete search history.

(56) References Cited

U.S. PATENT DOCUMENTS

| 5,544,010 A * | 8/1996 | Schultz ................... G06F 1/163 |
| | | 361/679.41 |
| 5,596,762 A * | 1/1997 | Rudi ..................... G06F 1/1656 |
| | | 710/301 |
| 9,886,060 B2 * | 2/2018 | Goy ....................... B64D 45/00 |
| 10,191,514 B2 * | 1/2019 | Bidwell ................ G06F 1/1626 |
| 10,485,312 B2 * | 11/2019 | Rodriguez ............. A45C 11/00 |
| 2006/0002070 A1 * | 1/2006 | Jenkins ................. G06F 1/1632 |
| | | 707/999.102 |
| 2006/0119569 A1 * | 6/2006 | Tsai ................... H04B 10/1143 |
| | | 345/156 |

(Continued)

FOREIGN PATENT DOCUMENTS

| DE | 102016218138 A1 | 3/2018 |
| DE | 102019209166 A1 | 10/2020 |

OTHER PUBLICATIONS

Kabellose-Ladegeraete.De:; "IPad bzw. Tablet kabellos laden: Alle Qi Tablets im Überlick"; URL: https://www.kabellose-ladegeraete.de/blog/tablet-kabellos-laden-qi-tablet-ueberblick/.

(Continued)

*Primary Examiner* — Adrian S Wilson
(74) *Attorney, Agent, or Firm* — Harness, Dickey & Pierce, P.L.C.

(57) ABSTRACT

A docking station is for accommodating a tablet computer device. In an embodiment, the docking station includes a housing, and an interface apparatus for connecting the tablet computer device to the housing. The housing is configured to accommodate the interface apparatus in a form-fit manner. The interface apparatus is configured such that the tablet computer device is dockable in a form-fit manner to the interface apparatus upon the interface apparatus being accommodated in a form-fit manner in the housing.

20 Claims, 7 Drawing Sheets

(56) References Cited

U.S. PATENT DOCUMENTS

| | | | |
|---|---|---|---|
| 2007/0097617 A1* | 5/2007 | Searby | F16M 11/041 |
| | | | 361/679.21 |
| 2007/0097618 A1* | 5/2007 | Searby | F16M 13/02 |
| | | | 361/679.21 |
| 2008/0059681 A1* | 3/2008 | Lodolo | G06F 1/1632 |
| | | | 710/303 |
| 2010/0081377 A1* | 4/2010 | Chatterjee | G06F 1/1632 |
| | | | 455/41.1 |
| 2013/0068915 A1 | 3/2013 | Yang | |
| 2014/0183065 A1* | 7/2014 | Toulotte | A45C 11/00 |
| | | | 206/37 |
| 2015/0083615 A1* | 3/2015 | Lay | H04M 1/04 |
| | | | 206/45.24 |
| 2016/0241289 A1* | 8/2016 | Wieth | H04M 1/04 |
| 2016/0261133 A1* | 9/2016 | Wang | H02J 50/10 |
| 2017/0237460 A1* | 8/2017 | Rayner | H05K 5/0017 |
| | | | 455/575.8 |
| 2017/0279478 A1* | 9/2017 | Fathollahi | H04B 1/3877 |
| 2018/0055166 A1* | 3/2018 | Rodriguez | A45C 11/00 |
| 2018/0078222 A1* | 3/2018 | Boettger | G05B 19/048 |
| 2018/0279979 A1 | 10/2018 | Mueller | |
| 2021/0405700 A1* | 12/2021 | Betz | G06F 1/1632 |

OTHER PUBLICATIONS

U.S. Appl. No. 17/356,786, filed Jun. 24, 2021.

\* cited by examiner

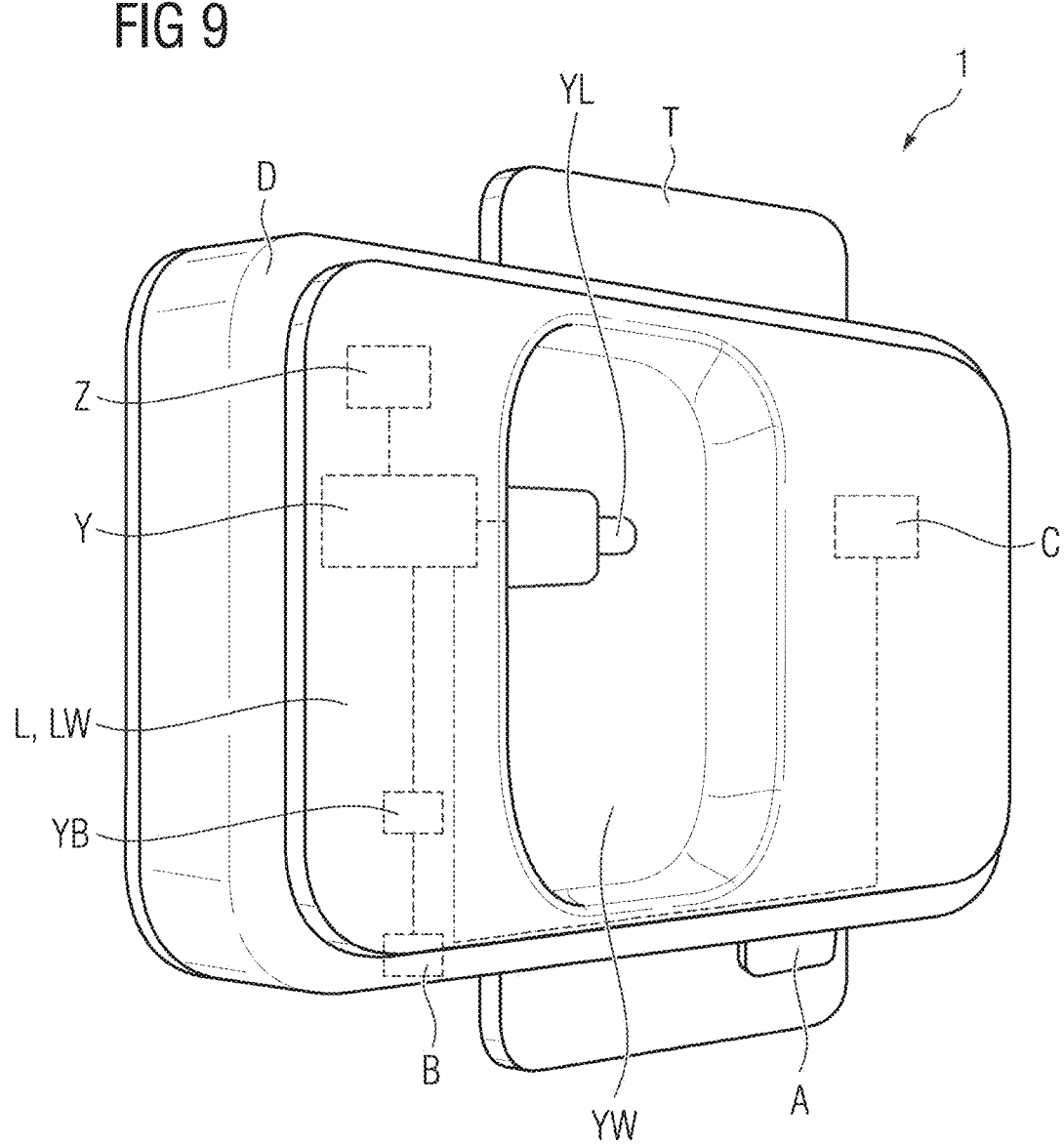

DOCKING STATION FOR ACCOMMODATING A TABLET COMPUTER DEVICE

PRIORITY STATEMENT

The present application hereby claims priority under 35 U.S.C. § 119 to German patent application number DE 202020103384.0 filed Jun. 12, 2020, the entire contents of which are hereby incorporated herein by reference.

FIELD

Example embodiments of the invention generally relate to a docking station for accommodating a tablet computer device. Example embodiments of the invention further generally relate to an arrangement comprising a tablet computer device and a docking station.

BACKGROUND

A medical imaging apparatus, for example a computed tomography (CT) device, can be operated via a tablet computer, for example. In a medical examination performed by the medical imaging apparatus, it can be advantageous if the tablet computer can be docked to a gantry of the medical imaging apparatus for particular examination steps and, for other examination steps, can be docked to a docking station of the medical imaging apparatus, wherein the docking station is disposed separately from the gantry of the medical imaging apparatus, e.g. behind a radiation protection wall.

SUMMARY

The inventors have discovered that in addition, it is advantageous if the tablet computer can be charged with electrical power on the docking station independently of an operating state of the gantry of the medical imaging apparatus, in particular when the gantry of the medical imaging apparatus is completely switched off.

The inventors have discovered that both docking and charging of the tablet computer can be implemented in different ways, wherein the same implementation should be used on the docking station and on the gantry to ensure better compatibility.

In addition, the inventors have discovered that there are different ways of mounting the docking station in relation to a base and/or in relation to a wall.

At least one embodiment of the invention provides a docking station for accommodating a tablet computer device that is improved in respect of its adaptability to different interface systems for docking and/or charging.

Further advantageous aspects of the invention are set forth in the claims.

At least one embodiment of the invention relates to a docking station for accommodating a tablet computer device, the docking station comprising:
 a housing; and
 an interface apparatus for connecting the tablet computer device to the housing,
 the housing being configured to accommodate the interface apparatus in a form-fit manner, and
 the interface apparatus being configured such that the tablet computer device is dockable to the interface apparatus in a form-fit manner upon the interface apparatus being accommodated in the housing in a form-fit manner.

At least one embodiment of the invention further relates to an arrangement comprising a tablet computer device and a docking station according to one of the disclosed embodiment or aspects for accommodating the tablet computer device.

In one embodiment, the arrangement also comprises a medical imaging apparatus, wherein the tablet computer device comprises a tablet computer configured to operate the medical imaging apparatus.

Also disclosed here in an embodiment is an arrangement comprising a tablet computer device and a docking apparatus of a gantry of a medical imaging apparatus, wherein the docking apparatus of the gantry is configured to accommodate the tablet computer device, wherein the docking apparatus comprises a housing section of the gantry and an interface apparatus for connecting the tablet computer device to the housing section of the gantry, wherein the housing section of the gantry is configured to accommodate the interface apparatus in a form-fit manner, wherein the interface apparatus is configured such that the tablet computer device is dockable in a form-fit manner to the interface apparatus upon the interface apparatus being accommodated in a form-fit manner in the gantry housing section.

BRIEF DESCRIPTION OF THE DRAWINGS

The invention will now be explained by way of example embodiments and with reference to the accompanying drawings. The representation in the figures is schematic, greatly simplified and not necessarily true to scale.

FIG. 9 shows a second view of an arrangement comprising a tablet computer device and a docking station having a wall bracket.

DETAILED DESCRIPTION OF THE EXAMPLE EMBODIMENTS

Figure 1:
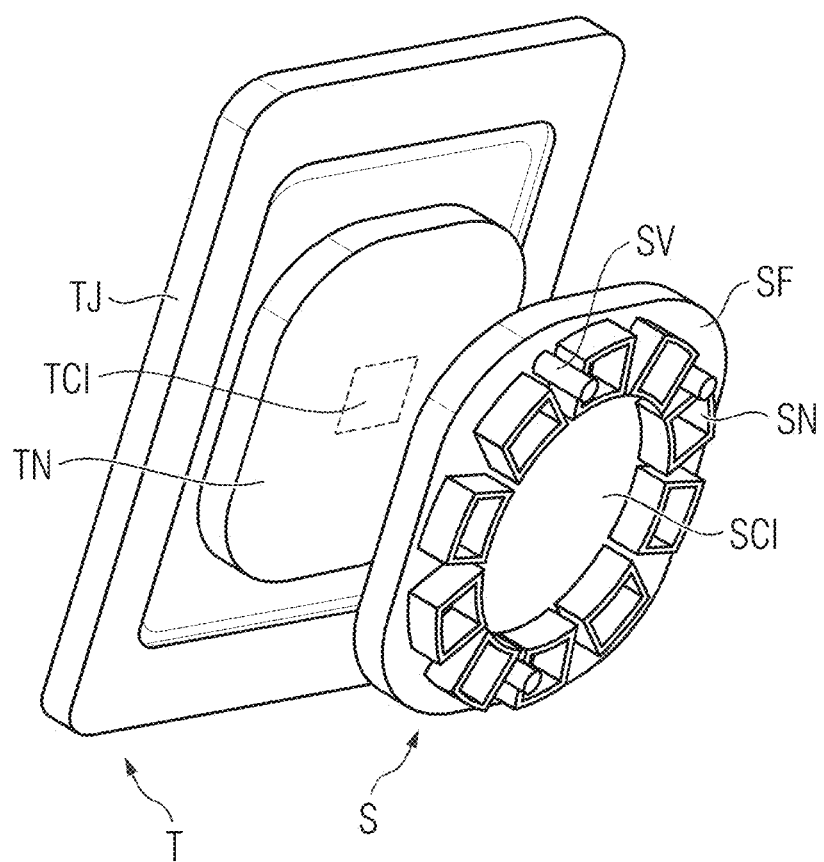
FIG. 1 shows a tablet computer device and an interface apparatus which can be detachably interconnected via a magnetic connection.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional devices shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with devices and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Devices and/or devices according to one or more example embodiments may be implemented using hardware, software, and/or a combination thereof. For example, hardware devices may be implemented using processing circuitry such as, but not limited to, a processor, Central Processing Device (CPU), a controller, an arithmetic logic device (ALU), a digital signal processor, a microcomputer, a field programmable gate array (FPGA), a System-on-Chip (SoC), a programmable logic device, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Device (CPU), a controller, an arithmetic logic device (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with devices and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional devices that perform various operations and/or functions to increase the clarity of the description. However, computer processing devices are not intended to be limited to these functional devices. For example, in one or more example embodiments, the various operations and/or functions of the functional devices may be performed by other ones of the functional devices. Further, the computer processing devices may perform the operations and/or functions of the various functional devices without sub-dividing the operations and/or functions of the computer processing devices into these various functional devices.

Devices and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially configured and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to a docking station for accommodating a tablet computer device, the docking station comprising:
 a housing; and
 an interface apparatus for connecting the tablet computer device to the housing,
 the housing being configured to accommodate the interface apparatus in a form-fit manner, and
 the interface apparatus being configured such that the tablet computer device is dockable to the interface apparatus in a form-fit manner upon the interface apparatus being accommodated in the housing in a form-fit manner.

The tablet computer device can comprise e.g. a tablet computer. The tablet computer can in particular be configured to operate a medical imaging apparatus. The docking station can in particular be base- and/or wall-mounted independently of a medical imaging apparatus gantry. In addition, it can be provided that the docking station weighs less than 10 kilograms, in particular less than 5 kilograms, e.g. less than 2 kilograms.

The housing can be made of at least one plastic and/or at least one metallic material, for example.

The interface apparatus allows the docking station to be very flexibly adapted to different interface systems for docking the tablet computer device. For example, it can be provided that an interface apparatus, to which the tablet computer device can be docked while simultaneously establishing a form-fit connection in the manner of a dovetail connection, is interchangeable with an interface apparatus to which the tablet computer device can be docked while simultaneously establishing a magnetic connection in a form-fit manner.

One embodiment provides that the housing comprises an interface-side connection device and that the interface apparatus comprises a housing-side connection device, wherein via the interface-side connection device of the housing and the housing-side connection device of the interface apparatus a releasable connection can be established which opposes removal of the interface apparatus from the housing when the interface apparatus is accommodated in a form-fit manner in the housing.

One embodiment provides that the interface apparatus has a housing-side area which is disposed in a planar manner in an interface plane, wherein the housing has a retaining frame which, via a form fit with the housing-side area of the interface apparatus, secures the interface apparatus against displacement in the interface plane when the interface apparatus is accommodated in the housing in a form-fit manner.

It can also be provided that the housing-side area of the interface apparatus is disc-shaped and/or cup-shaped.

One embodiment provides that the tablet computer device comprises an interface-side connection device and that the interface apparatus comprises a tablet-side connection device, wherein via the interface-side connection device of the tablet computer device and the tablet-side connection device of the interface apparatus a releasable connection can be established which opposes removal of the tablet computer device from the interface apparatus when the tablet computer device is docked to the interface apparatus in a form-fit manner.

In particular, the tablet computer device can have a tablet computer casing which encloses the tablet computer. In particular, the tablet computer casing can at least partially constitute and/or at least partially enclose the interface-side connection device of the tablet computer device.

For example, the interface-side connection device of the tablet computer device can comprise at least one protrusion and/or at least one indentation of the tablet computer casing to provide a form fit with the tablet-side connection device.

The interface-side connection device of the tablet computer device can comprise e.g. at least one ferromagnetic area of the tablet computer casing and/or at least one ferromagnetic area of the tablet computer device enclosed by the tablet computer casing.

According to one embodiment, the releasable connection that opposes removal of the tablet computer device from the interface apparatus comprises a magnetic connection, in particular is a magnetic connection. For example, the tablet-side connection device of the interface apparatus can have at least one magnet.

One embodiment provides that the releasable connection which opposes removal of the tablet computer device from the interface apparatus comprises a dovetail connection, in particular is a dovetail connection.

For example, the tablet-side connection device of the interface apparatus can have a protruding extension. The protruding extension can in particular have, at least in sections, a dovetail-shaped cross-section. The interface-side connection device of the tablet computer device can, for example, have a recess corresponding to the protruding extension for accommodating the protruding extension in a form-fit manner.

In one embodiment, the interface apparatus has an interface marking and the tablet computer device has a tablet marking, wherein the interface marking and the tablet marking relate to compatibility of the interface apparatus and the tablet computer device.

For example, the mutual compatibility of the interface apparatus and the tablet computer device can be indicated on the basis of the color and/or shape of the interface marking and/or on the basis of the color and/or shape of the tablet marking. For example, it can be provided that the interface apparatus and the tablet computer device are compatible with one another if, and only if, the interface marking and the tablet marking have the same color and/or the same shape, e.g. when the interface marking and the tablet marking are essentially identical, in particular are identical. In particular, the interface marking and the tablet marking can be in the form of a label in each case.

One embodiment provides that the docking station additionally comprises a charging module for charging the tablet computer device with electrical power, wherein the charging module is detachably connected to the housing, wherein the interface apparatus is configured such that the electrical power for charging the tablet computer device is transmittable via the interface apparatus and/or through the interface apparatus upon the interface apparatus being accommodated in a form-fit manner in the housing and the tablet computer device is docked to the interface apparatus in a form-fit manner.

The interface apparatus enables the docking station to be very flexibly adapted to different interface systems for charging the tablet computer device. For example, it can be provided that an interface apparatus, to which the tablet computer device can be docked in a form-fit manner while simultaneously establishing an inductive power transfer connection, is interchangeable with an interface apparatus to which the tablet computer device can be docked in a form-fit manner while simultaneously establishing a contact-based power transfer connection.

In one embodiment, the charging module is configured to inductively charge the tablet computer device with electrical power, wherein the interface apparatus has a power transfer area through which the electrical power can be inductively transferred with essentially no loss when the interface apparatus is accommodated in a form-fit manner in the housing and the tablet computer device is docked in a form-fit manner to the interface apparatus.

For example, the power transfer area of the interface apparatus can essentially consist of dielectric material and/or be thin walled to allow the shortest possible inductive power transfer distance.

In particular, the electrical power can be inductively transmitted from the charging module through the power transfer area to a receive module of the tablet computer device which is configured to inductively receive the electrical power with essentially no loss when the interface apparatus is accommodated in a form-fit manner in the housing and the tablet computer device is docked in a form-fit manner to the interface apparatus.

In one embodiment, the charging module is configured for contact-based charging of the tablet computer device with electrical power, wherein the interface apparatus comprises a contact-based power transfer device, wherein the electrical power can be transferred via the contact-based power transfer device when the interface apparatus is accommodated in a form-fit manner in the housing and the tablet computer device is docked in a form-fit manner to the interface apparatus.

For example, the contact-based power transfer device can have charging-module-side contacts for electrically conductive connection to the charging module, tablet-side contacts for electrically conductive connection to the tablet computer device, and electrically conductive connections of the charging-module-side contacts to the tablet-side contacts.

In particular, the electrical power can be transferred from the charging module via the contact-based power transfer device to a receive module of the tablet computer device which is configured for contact-based reception of the electrical power when the interface apparatus is accommodated in a form-fit manner in the housing and the tablet computer device is docked in a form-fit manner to the interface apparatus.

According to one embodiment, the docking station also comprises a mounting apparatus, wherein the mounting apparatus is detachably connected to the housing, wherein the mounting apparatus is configured for mounting the housing relative to a base and/or to a wall.

For example, the mounting pedestal can be made of a high density material such as cast iron. In particular, this means that the magnetic connection and the form fit between the tablet computer device and the interface apparatus can be released by a pulling force acting on the tablet computer device without the pulling force producing any appreciable movement of the docking station.

One embodiment provides that the mounting apparatus comprises a mounting pedestal for positioning the docking station on the base, wherein the mounting pedestal is made heavy enough to ensure that it secures the docking station against displacement relative to the base, in particular by virtue of its inertia, when the interface apparatus is accommodated in a form-fit manner in the housing, the tablet computer device is docked in a form-fit manner to the interface apparatus and a force is applied to the tablet computer device to remove the tablet computer device from the interface apparatus.

The base can be e.g. a table top or a floor plate. The base can extend in particular in a planar manner in a horizontal plane.

In particular, the force for removing the tablet computer device from the interface apparatus can be suitable for releasing the releasable connection established via the interface-side connection device of the tablet computer device and the tablet-side connection device of the interface apparatus.

One embodiment provides that the mounting apparatus comprises a wall bracket for attaching the docking station to a wall.

One embodiment provides that the docking station comprises a rocker bearing for tiltable mounting, in particular for mounting in a tiltable manner about a tilt axis, of the housing relative to the mounting apparatus such that, via the rocker bearing, an angle of inclination between a screen plane of the tablet computer device and the mounting apparatus can be varied, in particular can be varied in a stepped or continuous manner, when the interface apparatus is accommodated in a form-fit manner in the housing and the tablet computer device is docked in a form-fit manner to the interface apparatus.

At least one embodiment of the invention further relates to an arrangement comprising a tablet computer device and a docking station according to one of the disclosed embodiment or aspects for accommodating the tablet computer device.

In one embodiment, the arrangement also comprises a medical imaging apparatus, wherein the tablet computer device comprises a tablet computer configured to operate the medical imaging apparatus.

It can additionally be provided that the interface apparatus of the docking station of the arrangement is accommodated in a form-fit manner in the housing of the docking station of the arrangement, and that the tablet computer device of the arrangement is docked in a form-fit manner to the interface apparatus of the arrangement.

The rocker bearing can have e.g. a tilt locking mechanism for fixing the housing relative to the mounting apparatus, in particular such that the housing is secured against tilting motion about the tilt axis via the tilt locking mechanism.

The docking station provides a fast, energy-efficient, flexible and system-independent way of storing and/or charging a tablet that is used to operate a medical imaging apparatus. It can additionally be provided that a wireless remote control can also be docked to the docking station, in particular for charging it with electrical power. The total energy consumption during charging by the docking station is significantly lower than for charging via an interface on the gantry while the entire medical imaging apparatus is switched on. In addition, the docking station is very compact compared to the gantry. The docking station has a relatively small footprint and the installation and/or mounting thereof involves relatively few requirements.

For example, the medical imaging apparatus can be selected from the imaging modality group comprising an X-ray device, a C-arm X-ray device, a computed tomography (CT) device, a molecular imaging (MI) device, a single photon emission computed tomography (SPECT) device, a positron emission tomography (PET) device, a magnetic resonance (MR) tomography device, and combinations thereof, in particular a PET-CT device and a PET-MR device. The medical imaging apparatus can also comprise a combination of an imaging modality, e.g. selected from the imaging modality group, and an irradiation modality. The irradiation modality can comprise e.g. an irradiation device for therapeutic irradiation.

The gantry of a medical imaging apparatus typically has a support structure on which are disposed, in particular, components of the acquisition device, in particular the radiation source and/or the radiation detector. The support structure of the gantry typically has such high rigidity and strength that the components of the acquisition device can be disposed both relative to one another and relative to a region of interest in a sufficiently defined geometry for imaging.

The gantry of a computed tomography device typically has a support structure on which are disposed, in particular, components of the projection data acquisition system, in particular the X-ray radiation source and/or the X-ray radiation detector. The support structure of the gantry typically has such high rigidity and strength that the components of the acquisition device can be arranged both relative to one another and relative to a region of interest in a sufficiently defined geometry for imaging.

In a computed tomography device, the gantry typically comprises a support frame and a rotor rotatably mounted relative to the support frame, wherein the X-ray radiation source and the X-ray radiation detector are disposed on the rotor. The gantry can optionally comprise a tilting frame tiltably mounted relative to the support frame, wherein the rotor is disposed on the tilting frame.

Also disclosed here in an embodiment is an arrangement comprising a tablet computer device and a docking apparatus of a gantry of a medical imaging apparatus, wherein the docking apparatus of the gantry is configured to accommodate the tablet computer device, wherein the docking apparatus comprises a housing section of the gantry and an interface apparatus for connecting the tablet computer device to the housing section of the gantry, wherein the housing section of the gantry is configured to accommodate the interface apparatus in a form-fit manner, wherein the interface apparatus is configured such that the tablet computer device can be docked in a form-fit manner to the interface apparatus when the interface apparatus is accommodated in a form-fit manner in the gantry housing section. For example, the housing section of the gantry can be incorporated in a panel of the gantry. In particular, the docking apparatus can be implemented in accordance with one of the aspects disclosed for the docking station. In particular, the housing section of the gantry can be implemented in accordance with one of the aspects disclosed for the housing of the docking station.

In the context of the invention, features described in relation to different embodiments of the invention and/or different claims categories (method, use, apparatus, system, arrangement, etc.) can be combined to form further embodiments of the invention.

For example, a claim relating to an apparatus can also be further developed using features described or claimed in connection with a method, and vice versa. Functional features of a method can be carried out by correspondingly configured components. In addition to the embodiments of the invention expressly described in this application, various further embodiments of the invention are conceivable which will be apparent to persons skilled in the art without departing from the scope of the invention as defined by the claims.

The expression "based on" can be understood in the context of the present application in particular in the sense of the expression "using". In particular, a formulation according to which a first feature is produced (alternatively: determined, ascertained, etc.) based on a second feature does not exclude that the first feature can be produced (alternatively: determined, ascertained, etc.) on the basis of a third feature.

FIG. 1 shows the tablet computer device T and the interface apparatus S which can be detachably connected to one another via a magnetic connection. The tablet computer device T comprises the tablet computer TT which is configured to operate a medical imaging apparatus. The tablet computer device T also comprises a tablet computer casing TJ which encloses the tablet computer TT.

The tablet computer device T comprises the interface-side connection device TN. The interface apparatus S comprises the tablet-side connection device SN. Via the interface-side connection device TN of the tablet computer device T and the tablet-side connection device SN of the interface apparatus S, a releasable connection can be created which opposes removal of the tablet computer device T from the interface apparatus S when the tablet computer device T is docked in a form-fit manner to the interface apparatus S.

The interface apparatus S comprises the housing-side area SF disposed in a planar manner in an interface plane SE. In the example shown in FIG. 1, the housing-side area SF of the interface apparatus S is cup-shaped.

In the example shown in FIG. 1, the releasable connection that opposes removal of the tablet computer device T from the interface apparatus S comprises a magnetic connection. For this purpose, the tablet-side connection device SN of the interface apparatus S comprises a plurality of magnets arranged in a ring around the power transfer area SCI.

In the example shown in FIG. 1, the interface apparatus S has a power transfer area SCI through which electrical power can be transmitted with essentially no loss when the interface apparatus S is accommodated in a form-fit manner in the housing D and the tablet computer device T is docked in a form-fit manner to the interface apparatus S. The tablet computer device T has a receive module TCI that is configured to receive electrical power inductively.

Figure 2:
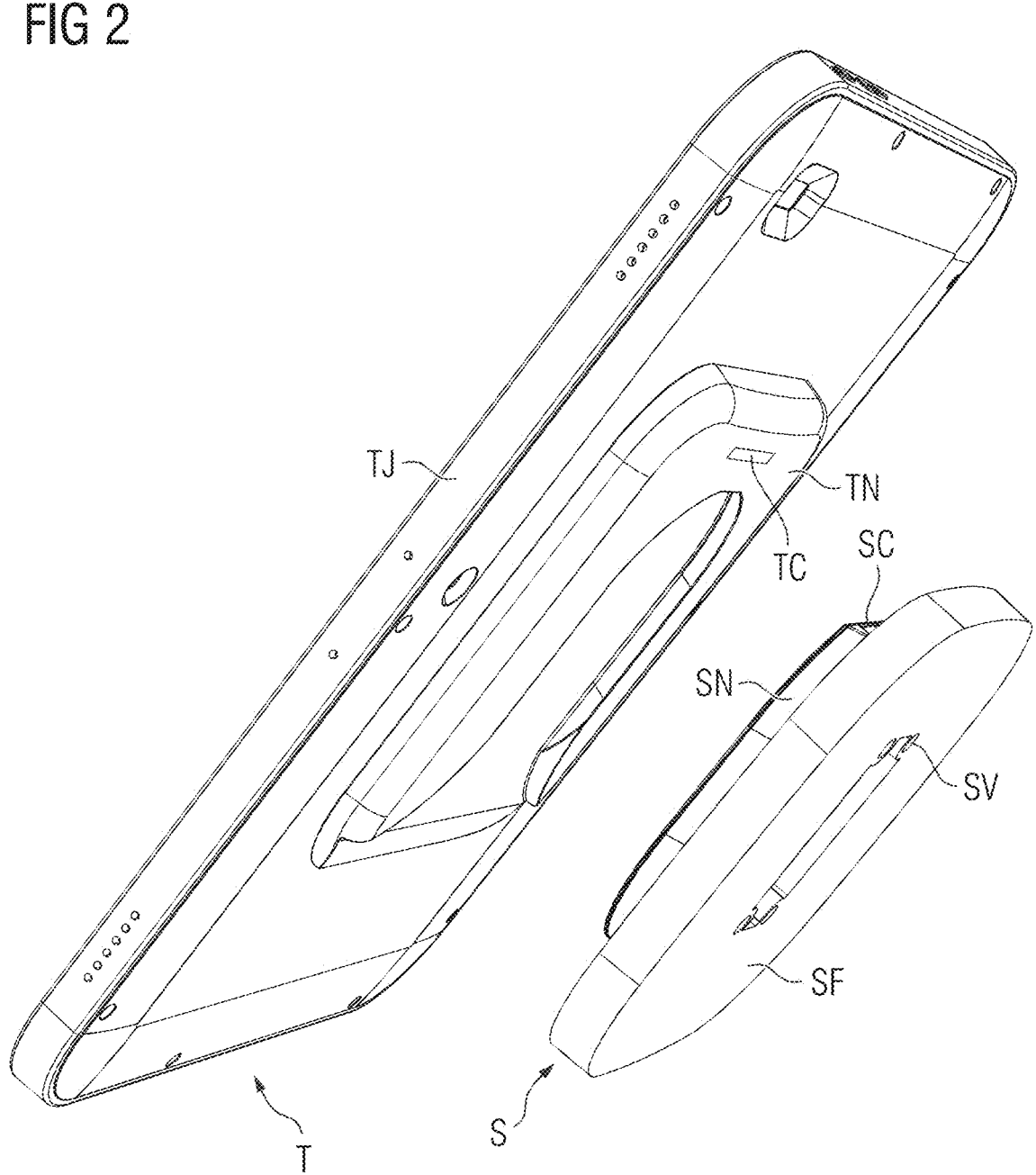
FIG. 2 shows a tablet computer device and an interface apparatus which can be detachably interconnected via a dovetail connection.

FIG. 2 shows the tablet computer device T and the interface apparatus S which can be detachably interconnected via a dovetail connection.

In the example shown in FIG. 2, the releasable connection that opposes removal of the tablet computer device T from the interface apparatus S comprises a dovetail connection. The tablet-side connection device SN of the interface apparatus S has a protruding extension which, at least in sections, has a dovetail-shaped cross-section. The interface-side connection device TN of the tablet computer device T has a recess corresponding to the protruding extension for form-fit accommodation of the protruding extension.

In the example shown in FIG. 2, the housing-side area SF of the interface apparatus S is disc-shaped.

In the example shown in FIG. 2, the interface apparatus S has a contact-based power transfer device SC, wherein the electrical power can be transmitted via the contact-based power transfer device SC when the interface apparatus S is accommodated in a form-fit manner in the housing D and the tablet computer device T is docked in a form-fit manner to the interface apparatus S. The tablet computer device T has a receive module TC that is configured for contact-based reception of the electrical power.

The contacts on the charging module side for electrically conductive connection to the charging module C are located in a central region of the housing-side area SF of the interface apparatus S. The contacts on the tablet side for electrically conductive connection to the tablet computer device T are located at the end of the protruding extension facing the receive module TC.

Figure 3:
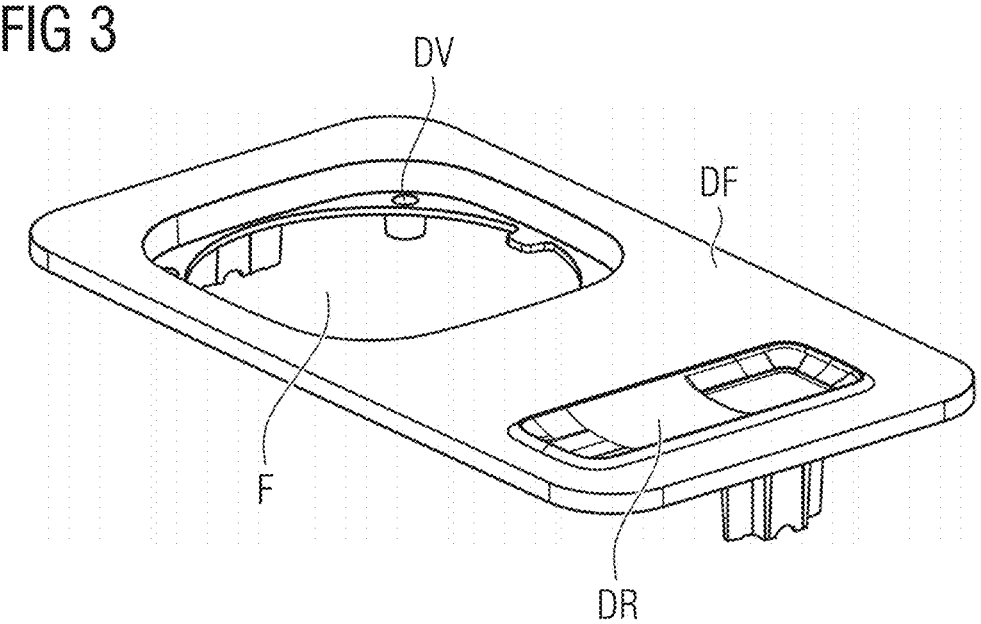
FIG. 3 shows a retaining frame constituted by a housing section.

FIG. 3 shows the retaining frame DF which is constituted by a housing section. The housing D comprises the retaining frame DF which secures the interface apparatus S against displacement in the interface plane SE by way of a form fit with the housing-side area SF of the interface apparatus S when the interface apparatus S is accommodated in the housing D in a form-fit manner.

The retaining frame DF is constituted by a housing section of the housing D. The retaining frame DF surrounds the cutout F formed in the housing D. The housing-side area SF of the interface apparatus S is configured to correspond to the cutout F and can be accommodated in the cutout F in a form-fit manner.

The retaining frame DF has a support area on which an edge region of the housing-side area SF rests, thereby securing the interface apparatus S in a form-fit manner against movement in a direction perpendicular to the interface plane SE and from the tablet computer device T toward the housing D when the interface apparatus S is accommodated in a form-fit manner in the housing D.

The releasable connection which opposes removal of the interface apparatus S from the housing D, e.g. a screw connection and/or a plug-in connection established via the interface-side connection device DV of the housing D and the housing-side connection device SV of the interface apparatus S, secures the interface apparatus S in a form-fit manner against movement in a direction perpendicular to the interface plane SE and from the housing D toward the tablet computer device T.

Figure 4:
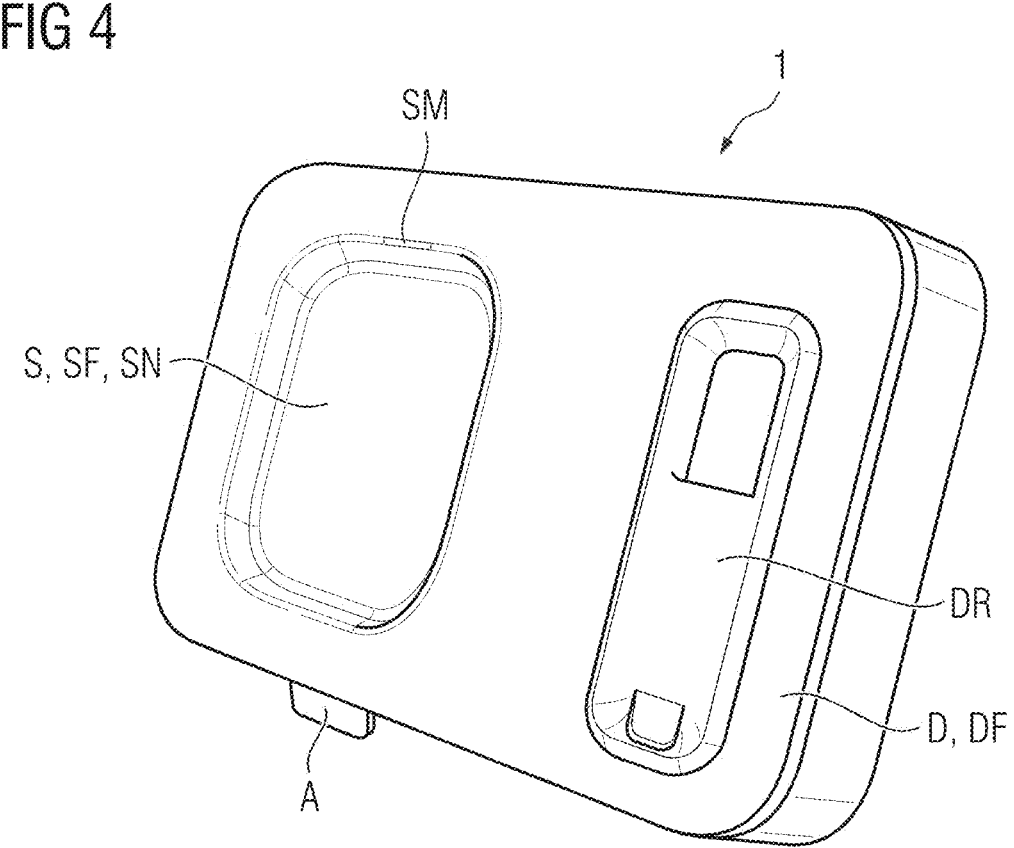
FIG. 4 shows a docking station configured to be magnetically connected to a tablet computer device in a releasable manner.

FIG. 4 shows the docking station 1, which is configured to be magnetically connectable in a releasable manner to the tablet computer device T according to the example shown in FIG. 1, for accommodating the tablet computer device T and the remote control R.

The docking station 1 comprises the housing D and the interface apparatus S for connecting the tablet computer device T to the housing D, wherein the housing D is configured to accommodate the interface apparatus S in a form-fit manner, wherein the interface apparatus S is configured such that the tablet computer device T can be docked in a form-fit manner to the interface apparatus S when the interface apparatus S is accommodated in a form-fit manner in the housing D.

The housing D comprises the interface-side connection device DV, wherein the interface apparatus S comprises a housing-side connection device SV, wherein, via the interface-side connection device DV of the housing D and the housing-side connection device SV of the interface apparatus S, a releasable connection can be established which opposes removal of the interface apparatus S from the housing D when the interface apparatus S is accommodated in a form-fit manner in the housing D.

The docking station 1 also comprises the interface DR for accommodating the remote control R in a form-fit manner. The interface DR can, for example, be accommodated in a form-fit manner in the housing D and/or be detachably connected to the housing D.

Figure 5:
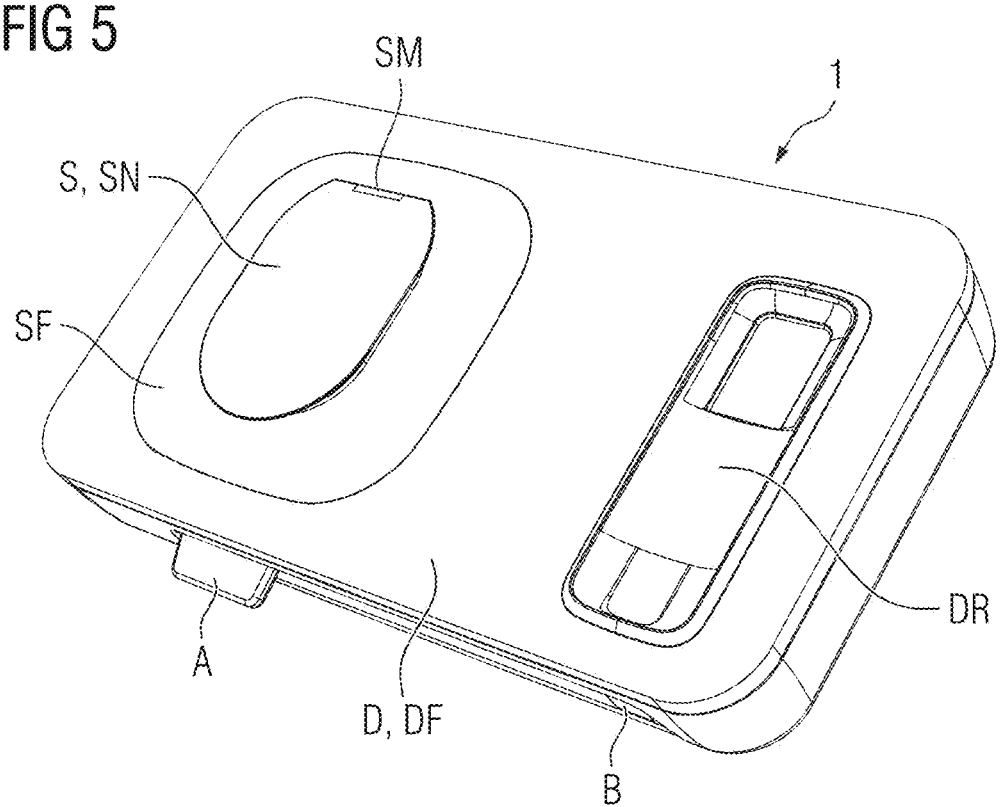
FIG. 5 shows a docking station configured to be connected to a tablet computer device using a releasable dovetail connection.

FIG. 5 shows the docking station 1 configured to provide a releasable dovetail connection with the tablet computer device T according to the example shown in FIG. 2, for accommodating the tablet computer device T and the remote control R.

Figure 6:
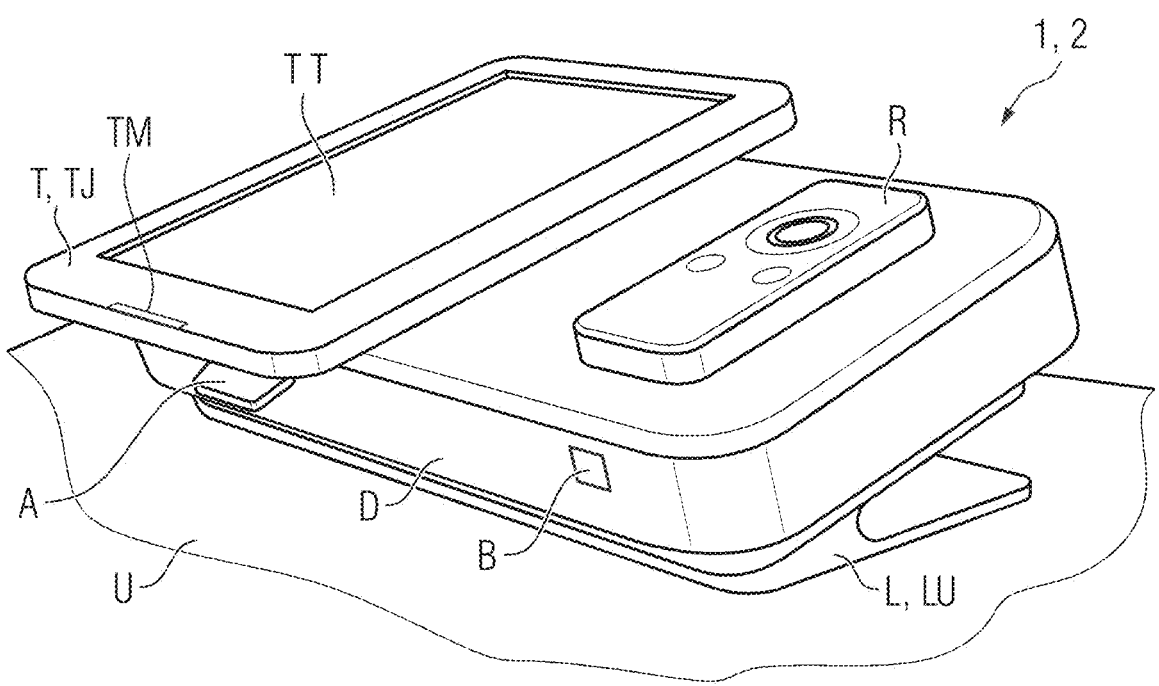
FIG. 6 shows a first view of an arrangement comprising a tablet computer device and a docking station having a mounting pedestal.

FIG. 6 shows a first view of the arrangement 2 with the tablet computer device T and the docking station 1 comprising the mounting apparatus L with the mounting pedestal LU, for accommodating the tablet computer device T. The tablet computer device T and the remote control R are disposed on the docking station 1.

The interface apparatus S of the docking station 1 of the arrangement 2 is accommodated in a form-fit manner in the housing D of the docking station 1 of the arrangement 2. The tablet computer device T of the arrangement 2 is docked in a form-fit manner to the interface apparatus S of the arrangement 2.

The interface apparatus S has the interface marking SM. The tablet computer device T has the tablet marking TM. The interface marking SM and the tablet marking TM relate to compatibility between the interface apparatus S and the tablet computer device T.

The remote control R can be used for mobile wireless operation of the medical imaging apparatus and can be charged with electrical power via cable via the charging socket B.

In addition, a signaling apparatus can be provided which is configured to detect and transmit a signal relating to a position of the remote control R relative to the medical imaging apparatus. The signal can, for example, be output optically via a light signal output device of the remote control R and/or acoustically via a sound signal output device of the remote control R. The signal can alternatively or additionally be output by vibration of the remote control R.

For example, a remote control user can be informed via the signal as to whether the distance from the remote control R to the medical imaging apparatus is less than a predetermined minimum distance and/or whether the distance from the remote control R to the medical imaging apparatus exceeds a predetermined maximum distance. For example, a remote control user can be informed via the signal as to whether the remote control R is located in an area in which operation of the medical imaging apparatus via the remote control R is not permitted and/or whether the remote control R is located in an area in which operation of the medical imaging apparatus via the remote control R is permitted.

Figure 7:
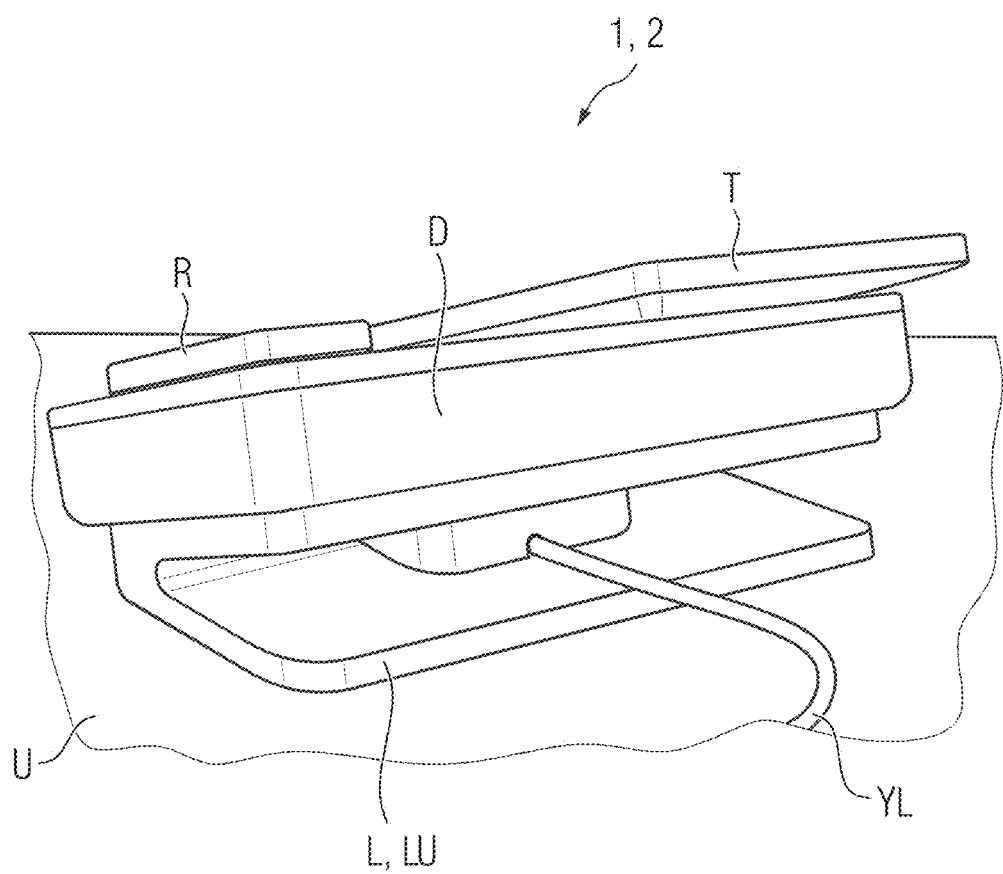
FIG. 7 shows a second view of an arrangement comprising a tablet computer device and a docking station having a mounting pedestal.

FIG. 7 shows a second view of the arrangement 2 with the tablet computer device T and the docking station 1 and comprising the mounting apparatus L with the mounting pedestal LU, for accommodating the tablet computer device T. The mounting apparatus L is detachably connected to the housing D and is configured for mounting the housing D relative to the base U.

The mounting apparatus L comprises the mounting pedestal LU for placing the docking station 1 on the base U, wherein the mounting pedestal LU is heavy enough to ensure that it secures the docking station 1 against displacement relative to the base U when the interface apparatus S is accommodated in a form-fit manner in the housing D, the tablet computer device T is docked in a form-fit manner to the interface apparatus S and a force is applied to the tablet computer device T to remove the tablet computer device T from the interface apparatus S.

The base U is e.g. a table top. The screen plane TE of the tablet computer device T is inclined relative to the base U. This enables the tablet computer device T to be used more ergonomically. The mounting apparatus L can also be configured for e.g. stepped or continuous adjustment of the angle of inclination between the screen plane TE of the tablet computer device T and the base U.

Figure 8:
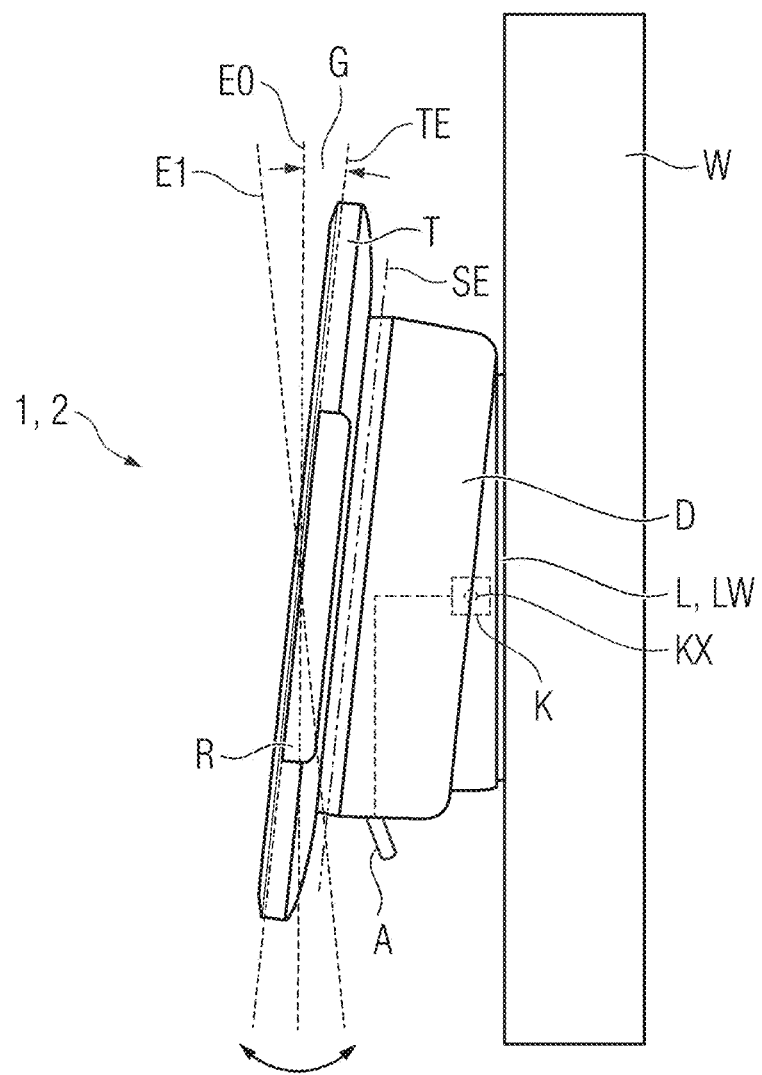
FIG. 8 shows a first view of an arrangement comprising a tablet computer device and a docking station having a wall bracket.

FIG. 8 shows a first view of the arrangement 2 with the tablet computer device T and the docking station 1 and comprising the wall bracket LW. The mounting apparatus L comprises the wall bracket LW for mounting the docking station 1 to the wall W.

The docking station 1 is fixed to the wall W via the wall bracket LW.

The docking station 1 has a rocker bearing K for tiltably mounting the housing D about the tilt axis KX relative to the mounting apparatus L such that an angle of inclination G between a screen plane TE of the tablet computer device T and the mounting apparatus L can be varied via the rocker bearing K when the interface apparatus S is accommodated in the housing D in a form-fit manner and the tablet computer device T is docked to the interface apparatus S in a form-fit manner.

The rocker bearing K has a tilt locking mechanism for fixing the housing D relative to the mounting apparatus L such that the housing D is secured against tilting movement about the tilt axis KX via the tilt locking mechanism. The tilt locking mechanism can be actuated, in particular activated and deactivated, via the lever A.

The screen plane TE of the tablet computer device T is parallel to the interface plane SE when the interface apparatus S is accommodated in a form-fit manner in the housing D and the tablet computer device T is docked in a form-fit manner to the interface apparatus S. The reference plane E0 is parallel to the surface of the wall W. By changing the tilt angle G via the rocker bearing K, the screen plane TE can be brought e.g. into the reference plane E0 or into the plane E1. For example, it can be provided that the tilt angle G can be varied in a range of minus 6 degrees to plus 6 degrees relative to the reference plane E0. This enables unwanted reflections on the screen of the tablet computer TT to be prevented.

FIG. 9 shows a second view of the arrangement 2 with the tablet computer device T and the docking station 1 and comprising the wall bracket LW.

The docking station 1 has a charging module C for charging the tablet computer device T with electrical power, wherein the charging module C is detachably connected to the housing D, wherein the interface apparatus S is configured such that the electrical power for charging the tablet computer device T can be transmitted via the interface apparatus S and/or through the interface apparatus S when the interface apparatus S is accommodated in a form-fit manner in the housing D and the tablet computer device T is docked in a form-fit manner to the interface apparatus S.

For the tablet computer device T according to the example shown in FIG. 1, a charging module C can be used which is configured for inductive charging of the tablet computer device T with electrical power. For the tablet computer device T according to the example shown in FIG. 2, a charging module C can be used which is configured for contact-based charging of the tablet computer device T with electrical power. The aforementioned charging modules can be interchanged with one another while retaining the housing D.

The docking station 1 comprises the power supply device Y, the fan Z, the DC/DC converter YB, e.g. in the form of an adapter, and the charging socket B, e.g. in the form of a USB port. The power supply device Y supplies the components of the docking station 1 with electrical power. The power supply device Y is connected to an electrical power supply network via the cable YL. The fan Z is configured to cool the components located in the housing D.

The docking station 1 has a cutout YW on the side where the wall bracket LW is located. The docking station 1 can be placed over a socket outlet, projecting from the wall W, of the electrical power supply network, in particular in the form of a flush-mounted grounding-type household socket outlet, in such a way that the socket outlet projects into the cutout YW and that the cable YL and a plug for the socket outlet are located inside the cutout YW, wherein the cable YL is connected to the socket outlet via the plug.

The docking station 1 thus constitutes a charging station on which both a tablet computer device T and a remote controller R can be charged, independently of an operating state of a gantry of a medical imaging apparatus which can be operated via the tablet computer device T and the remote control R.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A docking station for accommodating a tablet computer housed in a tablet computer casing, the docking station comprising:
    a housing, the housing including a retaining frame; and
    an interface apparatus, the interface apparatus including
        a first side configured to connect to the housing, the housing being configured to accommodate the interface apparatus in a first form-fit manner,
        a second side configured to connect to the tablet computer casing in a second form-fit manner, and
        a housing side area, the housing side area being planar in an interface plane, and the retaining frame being configured to form-fit with the housing side area and secure the interface apparatus against displacement in the interface plane via the form-fit upon the interface apparatus being accommodated in the first form-fit menner in the housing.

2. The docking station of claim 1, wherein
    the housing includes an interface-side connection device,
    the interface apparatus includes a housing-side connection device, and
    the interface-side connection device and the housing-side connection device are configured to create a releasable connection which opposes removal of the interface apparatus from the housing upon the interface apparatus being accommodated in the first form-fit manner in the housing.

3. The docking station of claim 1, wherein
    the tablet computer casing includes an interface-side connection device,
    the interface apparatus includes a tablet-side connection device, and
    the interface-side connection device and the tablet-side connection device are configured to create a releasable connection which opposes removal of the tablet computer casing from the interface apparatus upon the tablet computer casing being connected in the second form-fit manner to the interface apparatus.

4. The docking station of claim 3, wherein the releasable connection which opposes the removal of the tablet computer casing from the interface apparatus includes a magnetic connection.

5. The docking station of claim 3, wherein the releasable connection which opposes removal of the tablet computer casing from the interface apparatus includes a dovetail connection.

6. The docking station of claim 1, wherein
    the interface apparatus includes an interface marking,
    the tablet computer casing includes a tablet marking, and
    the interface marking and the tablet marking indicate a compatibility between the interface apparatus and the tablet computer casing.

7. The docking station of claim 1, further comprising:
    a charging module configured to detachably connect to the housing and to charge the tablet computer with electrical power, wherein
    the interface apparatus is configured to transmit the electrical power to the tablet computer upon the interface apparatus being accommodated in the first form-fit manner in the housing and the tablet computer casing being connected in the second form-fit manner to the interface apparatus.

8. The docking station of claim 7, wherein
    the charging module is configured to charge the tablet computer with the electrical power via inductive charging, and
    the interface apparatus includes a power transfer area configured to inductively transmit the electrical power upon the interface apparatus being accommodated in the first form-fit manner in the housing and the tablet computer casing being connected in the second form-fit manner to the interface apparatus.

9. The docking station of claim 7, wherein
    the charging module is configured to charge the tablet computer with the electrical power via contact-based charging,
    the interface apparatus includes a contact-based power transfer device, and
    the contact-based power transfer device is configured to transmit the electrical power to the tablet computer upon the interface apparatus being accommodated in the first form-fit manner in the housing and the tablet computer casing being connected in the second form-fit manner to the interface apparatus.

10. The docking station of claim 1, further comprising:
    a mounting apparatus, the mounting apparatus being configured to detachably connect to the housing and to mount the housing to at least one of a base or a wall.

11. The docking station of claim 10, wherein
    the mounting apparatus includes a mounting pedestal for placing the docking station on the base, and
    a weight of the mounting pedestal secures the docking station against displacement relative to the base upon
        the interface apparatus being accommodated in the first form-fit manner in the housing,
        the tablet computer casing being connected in the second form-fit manner to the interface apparatus, and
        a force being applied to the tablet computer casing to remove the tablet computer casing from the interface apparatus.

12. The docking station of claim 10, wherein the mounting apparatus includes a wall bracket configured to mount the docking station to the wall.

13. The docking station of claim 10, wherein
- the docking station includes a rocker bearing configured to mount the housing such that the housing is tiltable relative to the mounting apparatus, and
- an angle of inclination between a screen plane of the tablet computer housed in the tablet computer casing and the mounting apparatus is variable via the rocker bearing upon the interface apparatus being accommodated in the first form-fit manner in the housing and the tablet computer casing being connected in the second form-fit manner to the interface apparatus.

14. An arrangement, the arrangement comprising:
- the tablet computer; and
- the docking station of claim 1, to accommodate the tablet computer.

15. The arrangement of claim 14, the arrangement further comprising:
- a medical imaging apparatus, wherein the tablet computer is configured to operate the medical imaging apparatus.

16. The docking station of claim 2, wherein
- the interface-side connection device of the housing is a first interface-side connection device,
- the tablet computer casing includes a second interface-side connection device,
- the interface apparatus includes a tablet-side connection device, and
- the second interface-side connection device and the tablet-side connection device are configured to create a releasable connection which opposes removal of the tablet computer casing from the interface apparatus upon the tablet computer casing being connected the second form-fit manner to the interface apparatus.

17. The docking station of claim 16, wherein the releasable connection which opposes the removal of the tablet computer casing from the interface apparatus includes a magnetic connection.

18. The docking station of claim 16, wherein the releasable connection which opposes removal of the tablet computer casing from the interface apparatus includes a dovetail connection.

19. A docking station for accommodating a tablet computer housed in a tablet computer casing, the docking station comprising;
- a housing; and
- an interface apparatus, the interface apparatus having a first side configured to connect to the housing, the housing being configured to accommodate the interface apparatus in a first form-fit manner, and the interface apparatus having a Second side configured to connect to the tablet computer casing in a second form-fit manner, wherein
  - the housing includes a retaining frame having a cut out portion configured to receive a housing side area of the interface apparatus,
  - a shape of the housing side area corresponds to a shape of the cut out portion of the retaining frame,
  - the interface apparatus is accommodated by the housing in the first form-fit manner upon the cut out portion of the retaining frame receiving the housing side area of the interface apparatus, and
  - upon the interface apparatus being accommodated by the housing in the first form-fit manner, the retaining frame secures the interface apparatus against displacement in an interface plane that is planar with a surface of the housing side area.

20. The docking station of claim 19, wherein
- the cut out portion of the retaining frame includes a ridge configured to connect to the interface apparatus, and
- upon the housing side area being received by the cut out portion of the retaining frame, the interface apparatus rests on the ridge, the interface apparatus connects to the ridge, and the ridge secures the interface apparatus in a direction orthogonal to the interface plane.

* * * * *

UNITED STATES PATENT AND TRADEMARK OFFICE
CERTIFICATE OF CORRECTION

PATENT NO. : 11,809,230 B2
APPLICATION NO. : 17/337577
DATED : November 7, 2023
INVENTOR(S) : Marquart Ciolek et al.

It is certified that error appears in the above-identified patent and that said Letters Patent is hereby corrected as shown below:

In the Claims

In Column 19, delete the entire contents of Lines 29 - 46 and insert the Claim 1 listed below:
--1. A docking station for accommodating a tablet computer housed in a tablet computer casing, the docking station comprising:
    a housing, the housing including a retaining frame; and
    an interface apparatus, the interface apparatus including
        a first side configured to connect to the housing, the housing being configured to accommodate the interface apparatus in a first form-fit manner,
        a second side configured to connect to the tablet computer casing in a second form-fit manner, and
        a housing side area, the housing side area being planar in an interface plane, and the retaining frame being configured to form-fit with the housing side area and secure the interface apparatus against displacement in the interface plane via the form-fit upon the interface apparatus being accommodated in the first form-fit manner in the housing.--

Signed and Sealed this
Twenty-sixth Day of December, 2023

Katherine Kelly Vidal
*Director of the United States Patent and Trademark Office*